(12) United States Patent
Kanayama et al.

(10) Patent No.: US 9,740,681 B2
(45) Date of Patent: Aug. 22, 2017

(54) METHOD FOR CLASSIFYING PIECES OF TEXT ON BASIS OF EVALUATION POLARITY, COMPUTER PROGRAM PRODUCT, AND COMPUTER

(71) Applicant: International Business Machines Corporation, Armonk, NY (US)

(72) Inventors: Hiroshi Kanayama, Kanagawa-ken (JP); Takuma Murakami, Tokyo (JP); Daisuke Takuma, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 13/861,430

(22) Filed: Apr. 12, 2013

(65) Prior Publication Data

US 2013/0289978 A1    Oct. 31, 2013

(30) Foreign Application Priority Data

Apr. 25, 2012   (JP) .................................. 2012-100288

(51) Int. Cl.
*G06F 17/27* (2006.01)
*G06F 17/20* (2006.01)
(Continued)

(52) U.S. Cl.
CPC ................................ *G06F 17/2785* (2013.01)

(58) Field of Classification Search
None
See application file for complete search history.

(56) References Cited

U.S. PATENT DOCUMENTS 8,600,796 B1 * 12/2013 Sterne ................ G06Q 30/0201
                                                      705/7.29
2002/0138271 A1 * 9/2002 Shaw .................. G06F 17/2765
                                                       704/270
(Continued)

FOREIGN PATENT DOCUMENTS

JP            10-27181 A      1/1989
JP         2002-140465 A      5/2002
(Continued)

OTHER PUBLICATIONS

Turney, P. D. "Thumbs up or thumbs down? Semantic orientation applied to unsupervised classification of reviews", ACL '02 Proceedings of the 40th Annual Meeting on Association for Computational Linguistics, Jul. 2002, pp. 417-424, issued by Association for Computational Linguistics Stroudsburg.

*Primary Examiner* — Richemond Dorvil
*Assistant Examiner* — Thuykhanh Le
(74) *Attorney, Agent, or Firm* — Tutunjian & Bitetto, P.C.; Jennifer R. Davis

(57) ABSTRACT

A computer-implemented method, program product, and system, for extracting pieces of text from a plurality of pieces of text. The method includes: primarily evaluating a measure of positive expressions and a measure of negative expressions included in each of pieces of text; secondarily evaluating each of the pieces of text on the basis of a plurality of evaluation functions, where certain evaluation functions among the plurality of evaluation functions include, as variables, the measure of positive expressions and the measure of negative expressions; and extracting a piece of text having an evaluation result with a higher rating in preference to a piece of text having an evaluation result with a lower rating, where the individual evaluation results (Continued)

are based on the same evaluation function among the plurality of evaluation functions.

15 Claims, 8 Drawing Sheets

(51) Int. Cl.
  *G06F 17/21* (2006.01)
  *G06F 17/28* (2006.01)

(56) References Cited

U.S. PATENT DOCUMENTS

| | | | |
|---|---|---|---|
| 2003/0212546 A1* | 11/2003 | Shaw | G06F 17/279 704/9 |
| 2005/0187932 A1* | 8/2005 | Kanayama | G06F 17/2785 |
| 2006/0112134 A1* | 5/2006 | Tsuboi | G06F 17/277 |
| 2008/0270116 A1* | 10/2008 | Godbole | G06F 17/279 704/9 |
| 2008/0288481 A1* | 11/2008 | Zeng | G06Q 30/02 |
| 2009/0112892 A1* | 4/2009 | Cardie | G06F 17/30719 |
| 2009/0265332 A1* | 10/2009 | Mushtaq | G06F 17/30 |
| 2010/0079464 A1* | 4/2010 | Matsumura | G06F 17/2785 345/440 |
| 2010/0235308 A1* | 9/2010 | Takamatsu | G06F 17/2785 706/12 |
| 2010/0318526 A1* | 12/2010 | Nakazawa | G06F 17/2785 707/749 |
| 2011/0082687 A1* | 4/2011 | Pham | G06F 17/273 704/9 |
| 2011/0173191 A1* | 7/2011 | Tsaparas | G06Q 30/02 707/723 |
| 2011/0179009 A1* | 7/2011 | Nam | G06Q 30/0256 707/708 |
| 2011/0225174 A1* | 9/2011 | Artzt | G06Q 30/02 707/750 |
| 2011/0320542 A1* | 12/2011 | Bendel | G06F 17/274 709/206 |
| 2012/0197903 A1* | 8/2012 | Lu | G06Q 30/02 707/748 |
| 2012/0245924 A1* | 9/2012 | Brun | G06F 17/2765 704/9 |
| 2012/0246054 A1* | 9/2012 | Sastri | G06Q 50/01 705/37 |
| 2012/0290606 A1* | 11/2012 | Kumar | G06F 17/30867 707/769 |
| 2012/0290910 A1* | 11/2012 | Kumar | G06F 17/30893 715/205 |
| 2014/0114648 A1* | 4/2014 | Eggink | G06F 17/274 704/9 |

FOREIGN PATENT DOCUMENTS

| | | |
|---|---|---|
| JP | 2004-514220 A | 5/2004 |
| JP | 2006-146567 A | 6/2006 |
| JP | 2007-299071 A | 11/2007 |
| JP | 2008234090 | 10/2008 |
| JP | 2009510637 | 3/2009 |
| JP | 2011-85986 | 4/2011 |
| WO | WO 2008-075524 A1 | 6/2008 |
| WO | WO 2009-060829 A1 | 5/2009 |

* cited by examiner

FIG. 2
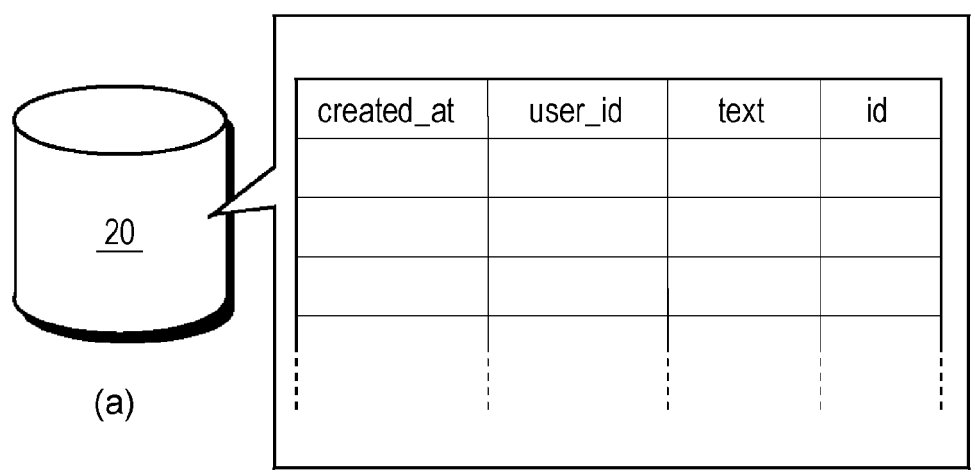
(a)
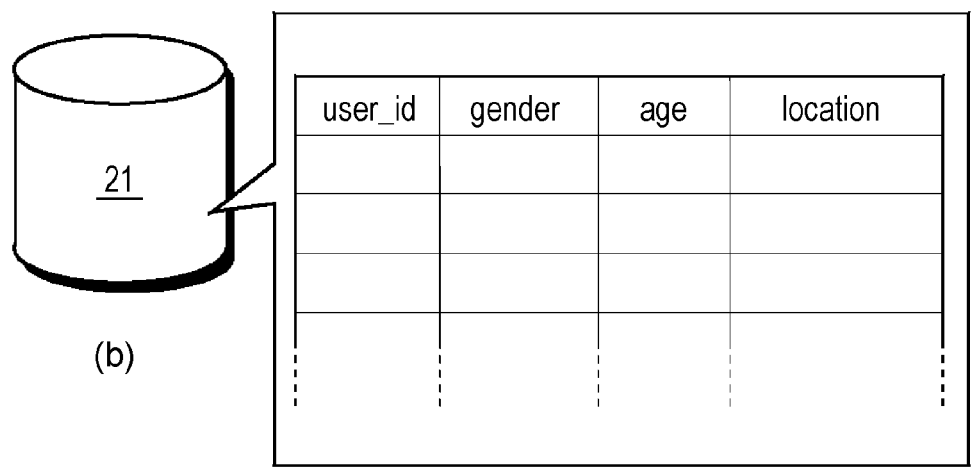
(b)

FIG. 8

METHOD FOR CLASSIFYING PIECES OF TEXT ON BASIS OF EVALUATION POLARITY, COMPUTER PROGRAM PRODUCT, AND COMPUTER

CROSS-REFERENCE TO RELATED APPLICATION

This application claims priority under 35 U.S.C. §119 from Japanese Patent Application No. 2012-100288 filed Apr. 25, 2012, the entire contents of which are incorporated herein by reference.

BACKGROUND OF THE INVENTION

Field of the Invention

The present invention relates to information processing methods for supporting reputation analysis. More specifically, it relates to a method, computer program product, and system for classifying pieces of text on the basis of evaluation polarity.

Description of Related Art

Along with the progress of information communication methods, patterns have been observed in which a larger number of people share opinions via the Internet. For example, a pattern has been observed in which, on a mail-order site, a purchaser of a product posts a piece of review text regarding the product has been observed, and a pattern in which, on a so-called word-of-mouth communication site, a user of a restaurant posts a piece of review text regarding the restaurant. In any of the patterns, users of the site can view the piece of review text at their leisure. Such a review function or review site is not only useful for users of a site because the users are guided to purchase products or utilize services in the future, but it is also useful for the provider of the products or services because valuable feedback from the purchasers/users can be obtained. It is not efficient for a person to read all of a large number of pieces of review text. There is a risk that the person will miss a useful piece of review text when the person randomly reads some of the pieces of review text. Until now, various technical schemes have been proposed in order to obtain useful findings from a large number of pieces of review text.

SUMMARY OF THE INVENTION

According to one aspect of the present invention, a computer-implemented method is provided for extracting pieces of text from a plurality of pieces of text. The method includes: primarily evaluating a measure of positive expressions and a measure of negative expressions included in each of pieces of text; secondarily evaluating each of the pieces of text on the basis of a plurality of evaluation functions, where certain evaluation functions among the plurality of evaluation functions include, as variables, the measure of positive expressions and the measure of negative expressions; and extracting a piece of text having an evaluation result with a higher rating in preference to a piece of text having an evaluation result with a lower rating, where the individual evaluation results are based on the same evaluation function among the plurality of evaluation functions.

According to another aspect of the present invention, a computer program product including a computer readable storage medium having program code embodied therewith, the program code readable/executable by a device to perform the steps of the computer-implemented method for extracting pieces of text from a plurality of pieces of text.

According to still another aspect of the present invention, a computer implemented system for extracting pieces of text from a plurality of pieces of text is provided. The system includes: a memory; a processor communicatively coupled to the memory; and a module communicatively coupled to the memory and the process where the module is configured to perform the steps of the computer-implemented method for extracting pieces of text from a plurality of pieces of text.

BRIEF DESCRIPTION OF THE DRAWINGS

FIG. 2 includes diagrams for explaining a data structure of data stored in hard disk apparatuses included in a review-site server according to an embodiment of the present invention.

FIG. 8 is a diagram illustrating an example of an output screen according to an embodiment of the present invention.

DETAILED DESCRIPTION OF THE PREFERRED EMBODIMENTS

Figure 1:
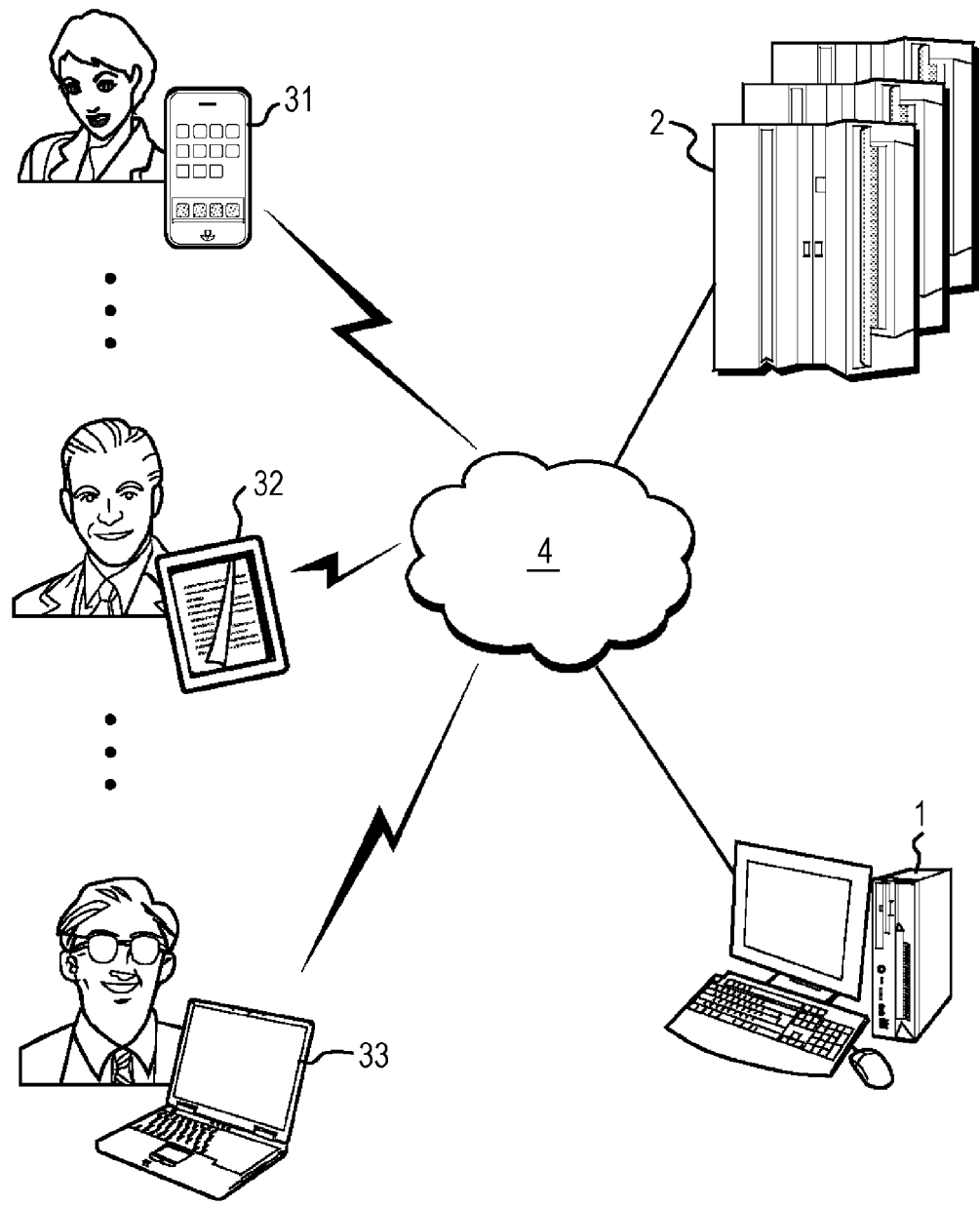
FIG. 1 is a schematic diagram for explaining a review-site system.

The present invention provides a method for efficiently extracting pieces of review text that a person (analyst) should refer to from a large number of pieces of review text in order to efficiently perform analysis of pieces of review text under limited time/resources.

According to embodiments of the present invention, a method is provided for extracting some pieces of text from a plurality of pieces of text by a computer. The method includes the steps of: primarily evaluating a measure of positive expressions and a measure of negative expressions included in each of pieces of text; secondarily evaluating each of the pieces of text on the basis of a plurality of evaluation functions, at least certain evaluation functions among the plurality of evaluation functions using, as variables, the measure of the positive expressions and the measure of the negative expressions; and extracting a piece of text having an evaluation result having a higher rating in preference to a piece of text having an evaluation result having a lower rating, the individual evaluation results being based on the same evaluation function among the plurality of evaluation functions.

One evaluation function among the certain evaluation functions can be a function outputting an evaluation result having a higher rating for a piece of text having an average measure of positive expressions and an average measure of negative expressions. Specifically, an expression that can be employed as this function is as follows: $_{p+n}C_p \alpha^p (1-\alpha)^n \times (p+n)$ where p is the number of positive expressions, n is the number of negative expressions, and a is a ratio of the number of positive expressions to a sum of the number of positive expressions and the number of negative expressions included in all of the pieces of text.

As another evaluation function, a sum of the measure of the positive expressions and the measure of the negative expressions or a difference between the measure of the positive expressions and the measure of the negative expressions can be selected.

Further, in the primary evaluating step, the measure of the positive expressions and the measure of the negative expressions can be primarily evaluated on the basis of the number of positive expressions and the number of negative expressions included in each of the pieces of text.

In the extracting step, pieces of text having individual evaluation results based on different evaluation functions among the plurality of evaluation functions can be extracted in a predetermined order.

Additionally, the method can further include a step of outputting the extracted piece of text to a user. In this case, which evaluation function has given the extracted piece of text an evaluation result so that the piece of text is extracted on the basis of the evaluation result can be output together to the user. Further, the positive expressions and the negative expressions included in the extracted piece of text can be output in different expression forms.

As a matter of course, also in the case of grasping the present invention as a computer program product or a computer system, technical features that are substantially the same as those in the above-described case of grasping the present invention as a method can be provided.

According to embodiments of the present invention, some pieces of review text that a person (analyst) should refer to can be efficiently extracted from a large number of pieces of review text.

The present invention is described in detail below with reference to the drawings. The embodiments given below are not intended to limit the inventions according to the claims. All combinations of features described in the embodiments are not necessarily essential to the solving means for the invention. Further, the present invention can be carried out in many different forms, and should not be construed as limited to the contents described in the embodiments set forth herein. The same elements are denoted by the same reference numerals (except where specifically noted) throughout the description of the embodiments.

FIG. 1 is a schematic diagram for explaining a review-site system. This system includes review-site server 2 and user terminals, which are connected so as to be capable of communicating with each other via Internet 4. Further, as the user terminals, computers having any configuration in which a communication function is provided can be employed. For example, in addition to smartphone 31, tablet 32, and (notebook) personal computer 33, which are illustrated, a personal data assistant (PDA), an on-vehicle computer, and a netbook, which are not illustrated, can be employed.

FIG. 2 is a diagram for explaining a data structure of data stored in hard disk apparatuses 20 and 21 included in review-site server 2. In a review table (FIG. 2(a)) stored in hard disk apparatus 20, a sending date and time (created_at) that indicates a date and time at which each piece of review text is sent/posted, a review ID (id) by which each piece of review text is identified, a user ID (user_id) by which a user who has sent the piece of review text is identified, and a piece of text (text) that is the content of the piece of review text are included. In a user table (FIG. 2(b)) stored in hard disk apparatus 21, a user ID (user_id) by which a user is identified, and information by which each of the gender (gender), age (age), and place of residence (location) of the user is identified are included. Note that an ID by which a product or service that is a review target can be added to the review ID.

Figure 3:
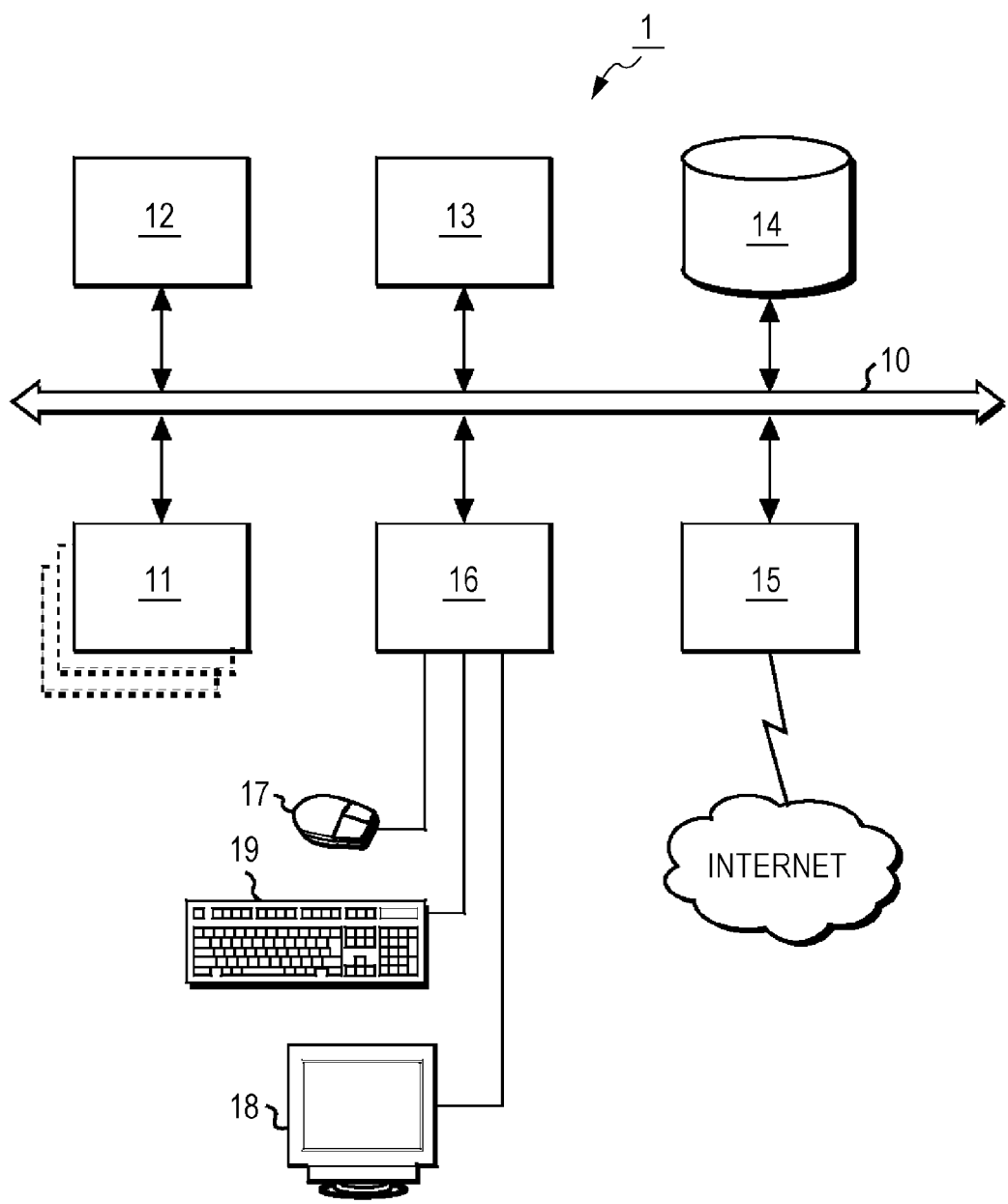
FIG. 3 is a block diagram for explaining a hardware configuration of a computer.

FIG. 3 is a block diagram for explaining a hardware configuration of personal computer 1. Regarding the hardware configuration of computer 1, (low-speed and high-speed) bus 10, CPU (arithmetic and control unit) 11, RAM (random-access memory: storage device) 12, ROM (read-only memory: storage device) 13, HDD (hard disk drive: storage device) 14, communication interface 15, and input/output interface 16, which are connected to bus 10, are included. Further, mouse 17, flat panel display (display device) 18, keyboard 19, and so forth, which are connected to input/output interface 16, are included. Note that a typical personal computer architecture is employed for computer 1. However, for example, for a demand for a higher data-processing capability or availability, multiple CPUs 11, multiple HDDs 14, or the like can be included. Also, various types of computer systems including, for example, a desktop type can be employed.

Regarding a software configuration of computer 1, an operating system (OS) that provides basic functions, a piece of application software that utilizes the functions of the OS, and a piece of driver software for an input/output device are included. Each of the pieces of software are loaded into RAM 12 together with various types of data, and executed by CPU 11 or the like, so that computer 1 functions, on the whole, as function modules illustrated in FIG. 4 to execute a process illustrated in FIG. 5.

Figure 4:
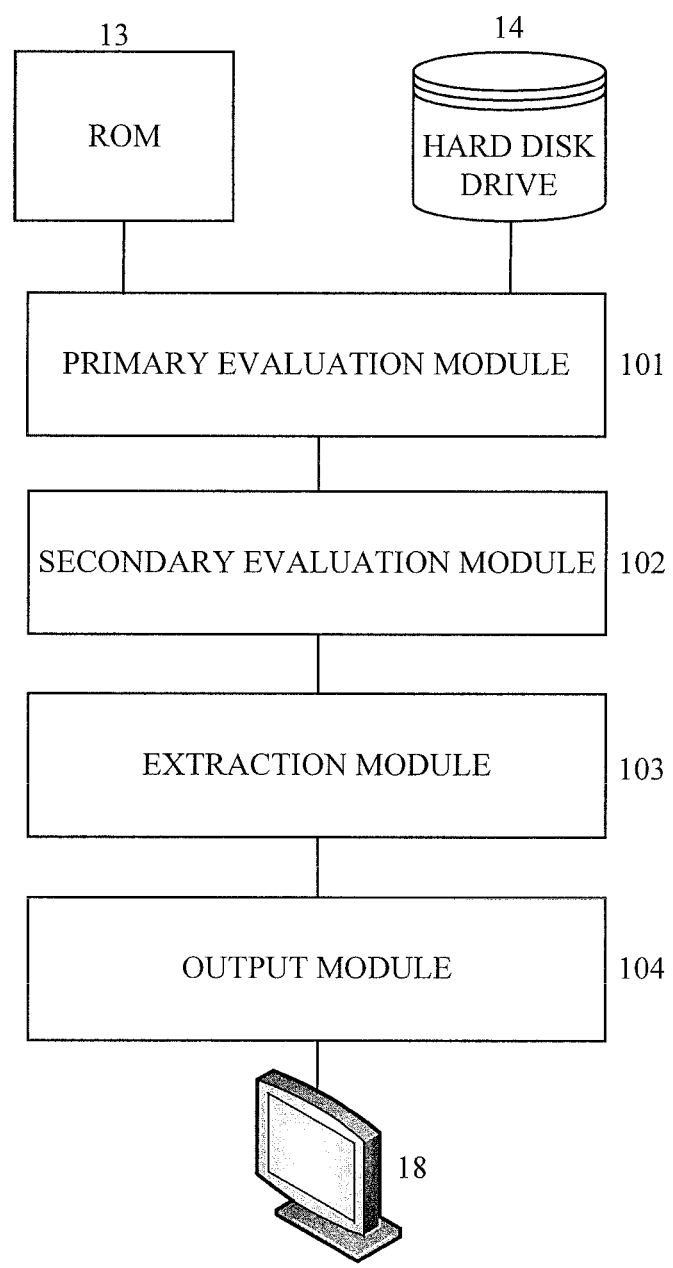
FIG. 4 is a functional block diagram of the computer according to an embodiment of the present invention.

FIG. 4 is a functional block diagram for explaining the function modules of computer 1 according to an embodiment of the present invention. Computer 1 functions as primary evaluation module 101, secondary evaluation module 102, extraction module 103, and output module 104.

Figure 5:
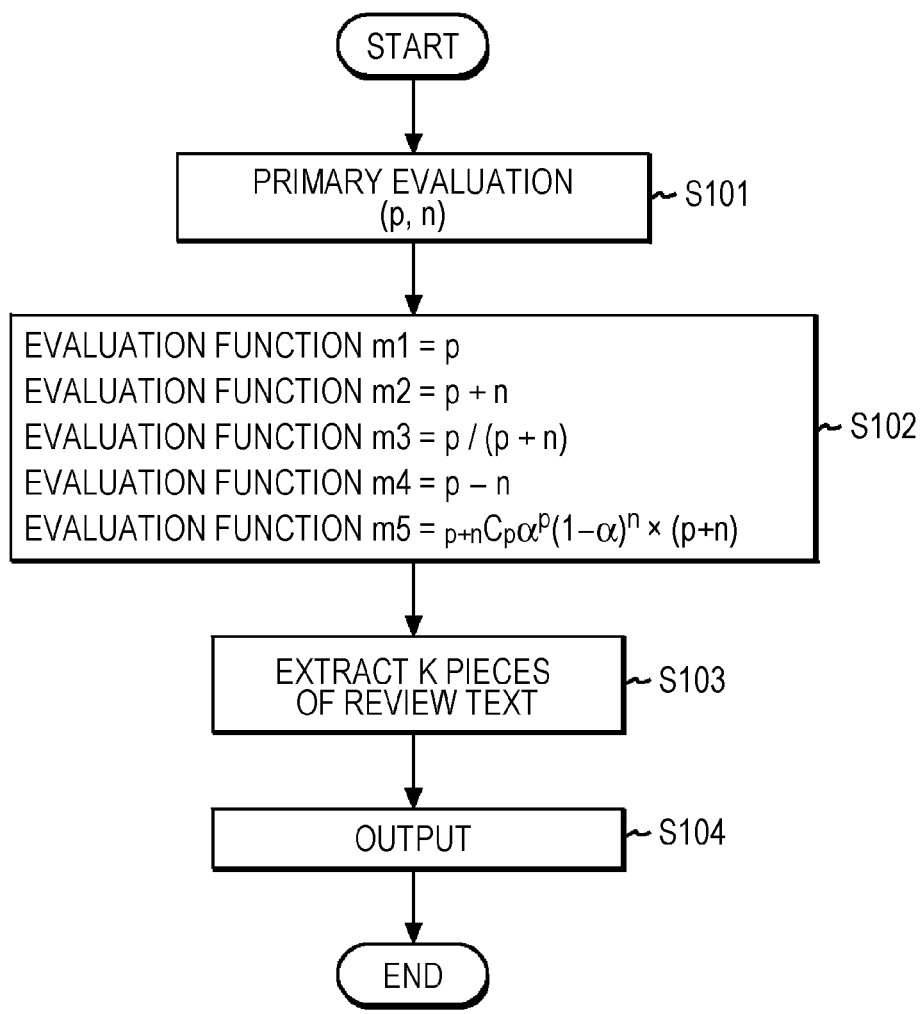
FIG. 5 is a flowchart for explaining a method performed by the computer according to an embodiment of the present invention.
Figure 6:
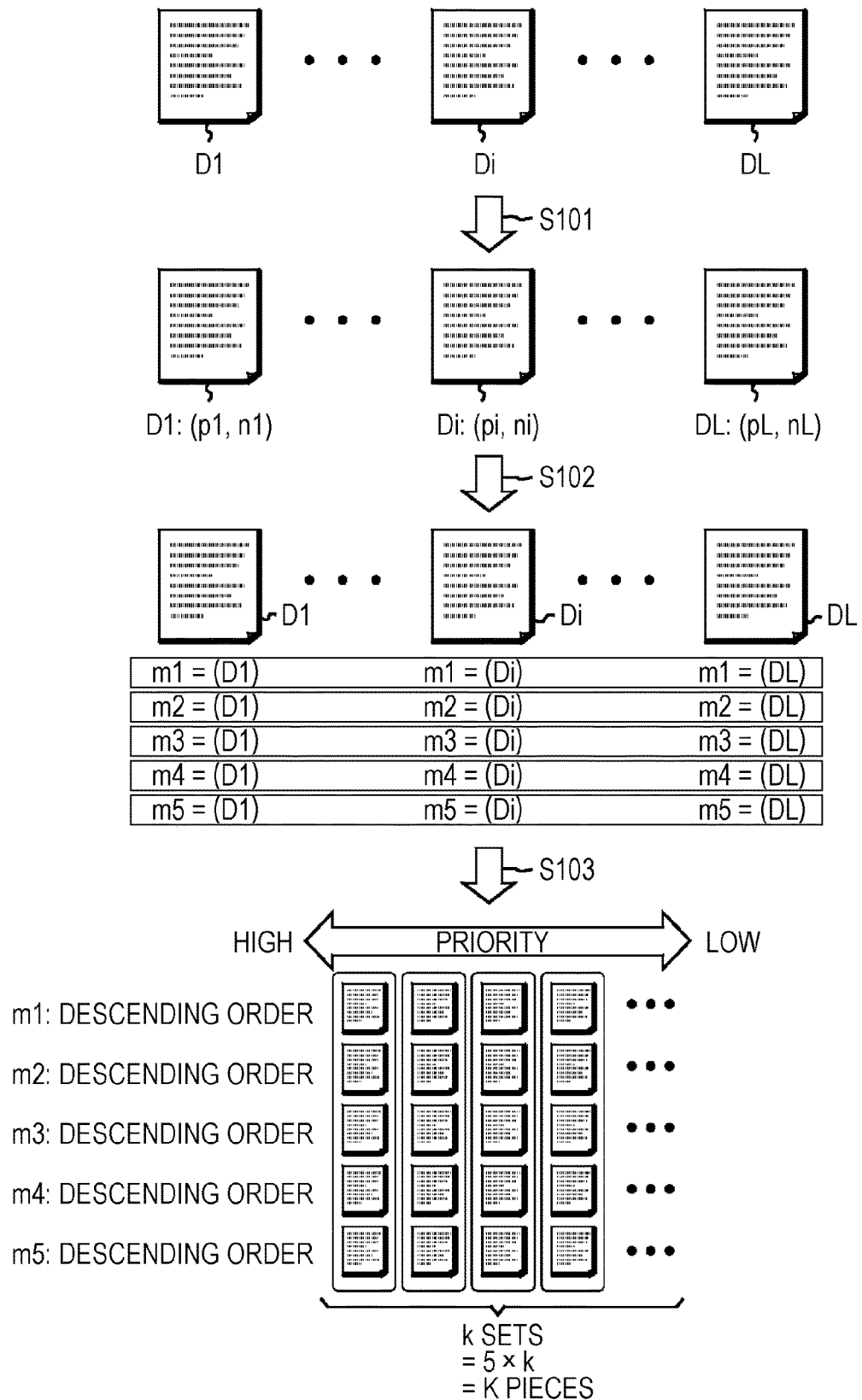
FIG. 6 is a schematic diagram for explaining a portion of the method performed by the computer according to an embodiment of the present invention.

FIG. 5 is a flowchart for explaining the process executed by computer 1. Further, FIG. 6 is a schematic diagram for explaining S101 to S103 of the flowchart of FIG. 5.

First, multiple pieces of review text D(1) to D(N) that each include a specific proper noun (here, denoted by PPP) are acquired in S101. Note that N is a value which is significantly large, and, consequently, a display screen of a list of the pieces of review text is not easily displayed. A condition is transmitted from computer 1 to review-site server 2. For example, a condition where PPP is included in a piece of review text and a time period in which the piece of review text is sent can be set within a specified time period.

Next, computer 1 receives data regarding a group of pieces of review text that satisfy the above-mentioned condition from review-site server 2. In this case, data (see FIG. 2(a)) regarding a group of pieces of review text that satisfies the above-mentioned condition and profiles (see FIG. 2(b)) of users, who are associated with the pieces of review text, are received. The received data is stored in HDD 14 of computer 1. The above-mentioned time period can include the future, and pieces of review text can be transmitted from review-site server 2 to computer 1 until the above-mentioned time period expires. Additionally, in a different configuration, where a large amount of data (see FIG. 2(a)) regarding groups of pieces of review text and a large number of profiles (see FIG. 2(b)) of users, who are associated with the pieces of review text, are stored in advance in HDD 14 of computer 1, a group of pieces of review text that satisfy the above-mentioned condition can be searched for from the data.

Next, the measure of positive expressions and the measure of negative expressions included in each of the pieces of review text are primarily evaluated by primary evaluation module 101 in S101. Here, a list of favorable words/expressions representing favorableness (positive expressions) and a list of unfavorable words/expressions representing unfavorableness (negative expressions) are stored in advance in HDD 14. The number of favorable words/expressions (p) and the number of unfavorable words/expressions included in each of the pieces of review text are counted. It is preferable that these evaluation words/expressions be set in advance in accordance with a product or service which is an evaluation target. In addition, for example, scores corresponding to the degrees of favorableness and scores corresponding to the degrees of unfavorableness can be set in advance for the individual favorable words/expressions and the individual unfavorable words/expressions, respectively, and the primary evaluation can be performed on the basis of these scores.

Below, results of the primary evaluation of four pieces of review text regarding a cosmetic product are provided. Portions inside the parentheses ( ) are favorable words/expressions, and portions inside the angle brackets < > are unfavorable words/expressions.

Review text 1: five favorable words and no unfavorable word

This product is (great)! The reason is that it comes in a (large volume) and is (cheap). Also because of its (high compatibility) with other skincare products, I (feel it's safe to use).

Review text 2: five favorable words and one unfavorable word

I (don't have trouble with pimples) particularly, but I bought this product because of its (reasonable price). It is (less irritating), and is (great) for young people. Now, because I have dry skin, even when, for example, a skin lotion is applied to my skin, my skin is <not well-moisturized>. So, I'm not using it right now. It seems (good) for people that have trouble with pimples.

Review text 3: four favorable words and one unfavorable word

I (feel it's safe to use) this product for rough skin or pimples, but I usually use a skin toner. I lightly apply and spread this product over my face, and pat my face. When the product is applied liberally on areas on which pimples appear, the areas will certainly (become better). In terms of moisturizability, people with dry skin are <not satisfied with> the product, but it is just right for my oily skin. (It's a good skin lotion).

Review text 4: two favorable words and three unfavorable words

I <don't think that this product is so effective>. I <don't think I need it> because, recently, I don't have pimples or acne. Because it has never irritated my skin, I'm using it as a skin toner. Will I buy it again? I don't know. But, it's cheep, isn't it??

Next, the pieces of review text are secondarily evaluated on the basis of multiple evaluation functions by secondary evaluation module 102 in S102. The following five evaluation functions are provided:

Evaluation function m1: $p$
Evaluation function m2: $p+n$
Evaluation function m3: $p/(p+n)$
Evaluation function m4: $p-n$
Evaluation function m5: $_{p+n}C_p \alpha^p (1-\alpha)^n \times (p+n)$ where $\alpha$ is a ratio of the number of favorable words to the number of evaluation words included in all the pieces of review text.

Evaluation function m1 evaluates a piece of review text D including a large number of favorable words so as to give it a high rating.

Evaluation function m2 evaluates a piece of review text including a large number of evaluation words regardless of whether the evaluation words are favorable words/unfavorable words so as to give it a high rating.

The evaluation function m3 evaluates a piece of review text having a high ratio of favorable words to evaluation words so as to give it a high rating.

Evaluation function m4 evaluates, by minimizing the number of unfavorable words, a piece of review text including a large number of favorable words so as to give it a high rating.

Evaluation function m5 evaluates a piece of review text having an average measure of positive expressions and an average measure of negative expressions so as to give it a higher rating. Evaluation function m5 is determined on the basis of the following background. Occurrence of the evaluation expressions included in all the pieces of review text is considered as a Bernoulli trial of a p ratio represented by an equation $\alpha = P_{all}/(P_{all} + N_{all})$. Where, $P_{all}$ and $N_{all}$ denote the number of favorable words and the number of unfavorable words, respectively, included in all the pieces of review text. The density function of the distribution of the p ratio obtained by carrying out the trial k times (k evaluation expressions) becomes a shape obtained by shrinking the density function of the binomial distribution $B(k, \alpha)$ by $1/k$ in the horizontal direction. In the distribution, a probability that a p ratio which is represented by an expression $p_x/(p_x + n_x)$ where $p_x$ and $n_x$ are the number of favorable words and the number of unfavorable words, respectively, included in a piece of review text x will be observed is considered as an index of the evaluation expressions for the piece of review text x. Note that, because it takes a lot of time to calculate the combination $_mC_n$ when m and n are large values, the distribution can be approximated by the normal distribution or the Poisson distribution if necessary.

Figure 7:
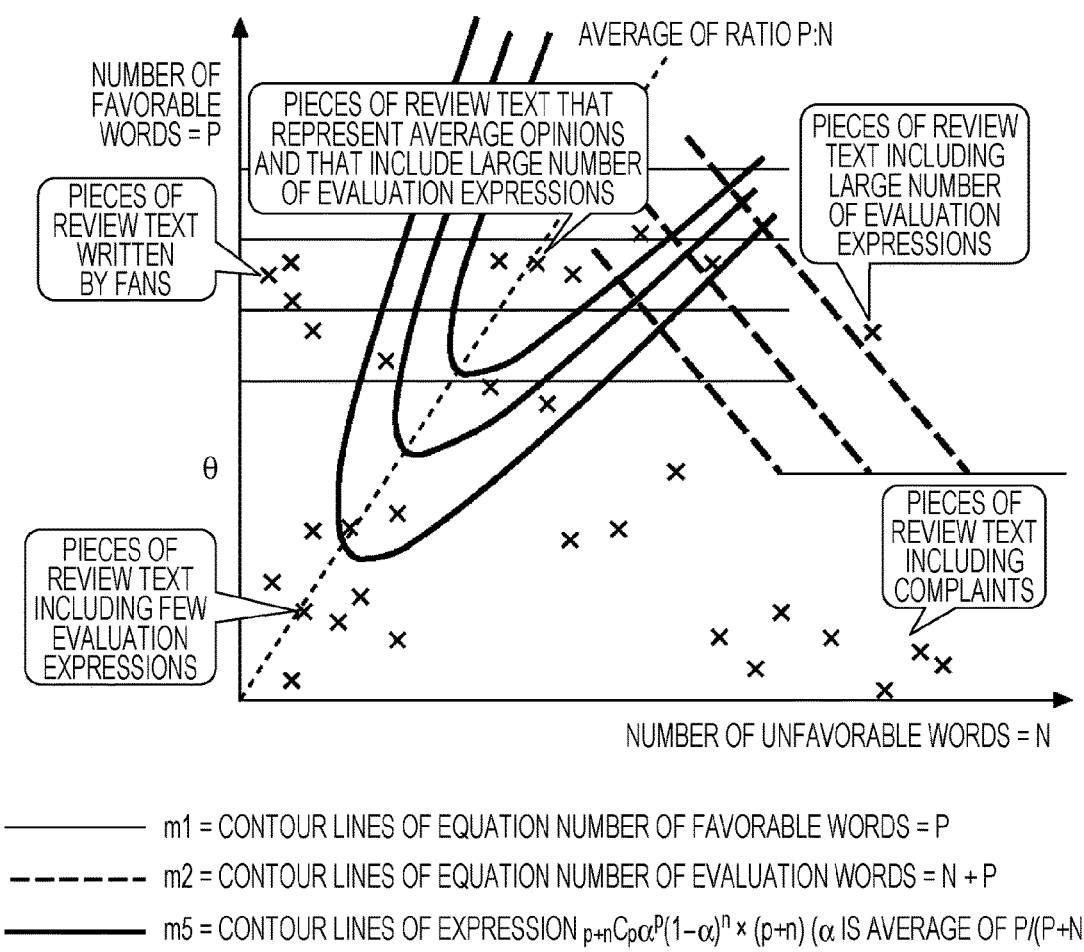
FIG. 7 is a schematic diagram for explaining the meanings of evaluation functions.

FIG. 7 is a graph for explaining evaluation functions m1, m2, and m5. In this two-dimensional graph, the vertical axis represents the number, p, of favorable words, and the horizontal axis represents the number, n, of unfavorable words. Each of the pieces of text D is plotted using a×mark. Further, the contour lines of evaluation function m1, m2, and m5 are represented by thin lines, dotted lines, and thick lines, respectively. The pieces of review text include various pieces of review text, such as a piece of review text including few evaluation expressions and a piece of review text including complaints. Pieces of review text written by fans, pieces of review text including a large number of evaluation expressions, and pieces of review text that represent average opinions and that include a large number of evaluation expressions are efficiently classified by evaluation function m1, evaluation function m2, and evaluation function m5, respectively.

Next, K pieces of review text are extracted by extraction module 103 in S103. Five evaluation scores are given to each of the pieces of review text D by evaluation functions m1 to m5. Extraction module 103 sorts, for each of the evaluation functions, the individual pieces of review text in order from a piece of review text to which the highest score is given. Then, a piece of review text to which the highest score is given by evaluation function m1, a piece of review text to which the highest score is given by evaluation function m2, a piece of review text to which the highest score is given by evaluation function m3, a piece of review text to which the highest score is given by evaluation function m4, and a piece of review text to which the highest score is given by evaluation function m5 (at most five in the case where duplication is eliminated) are selected.

Next, a piece of review text to which the second highest score is given by evaluation function m1, a piece of review text to which the second highest score is given by evaluation function m2, a piece of review text to which the second highest score is given by evaluation function m3, a piece of review text to which the second highest score is given by evaluation function m4, and a piece of review text to which the second highest score is given by evaluation function m5 (at most five in the case where duplication is eliminated) are selected. Then, selection of pieces of review text is performed until the number of pieces of review text reaches K.

Figure 8:
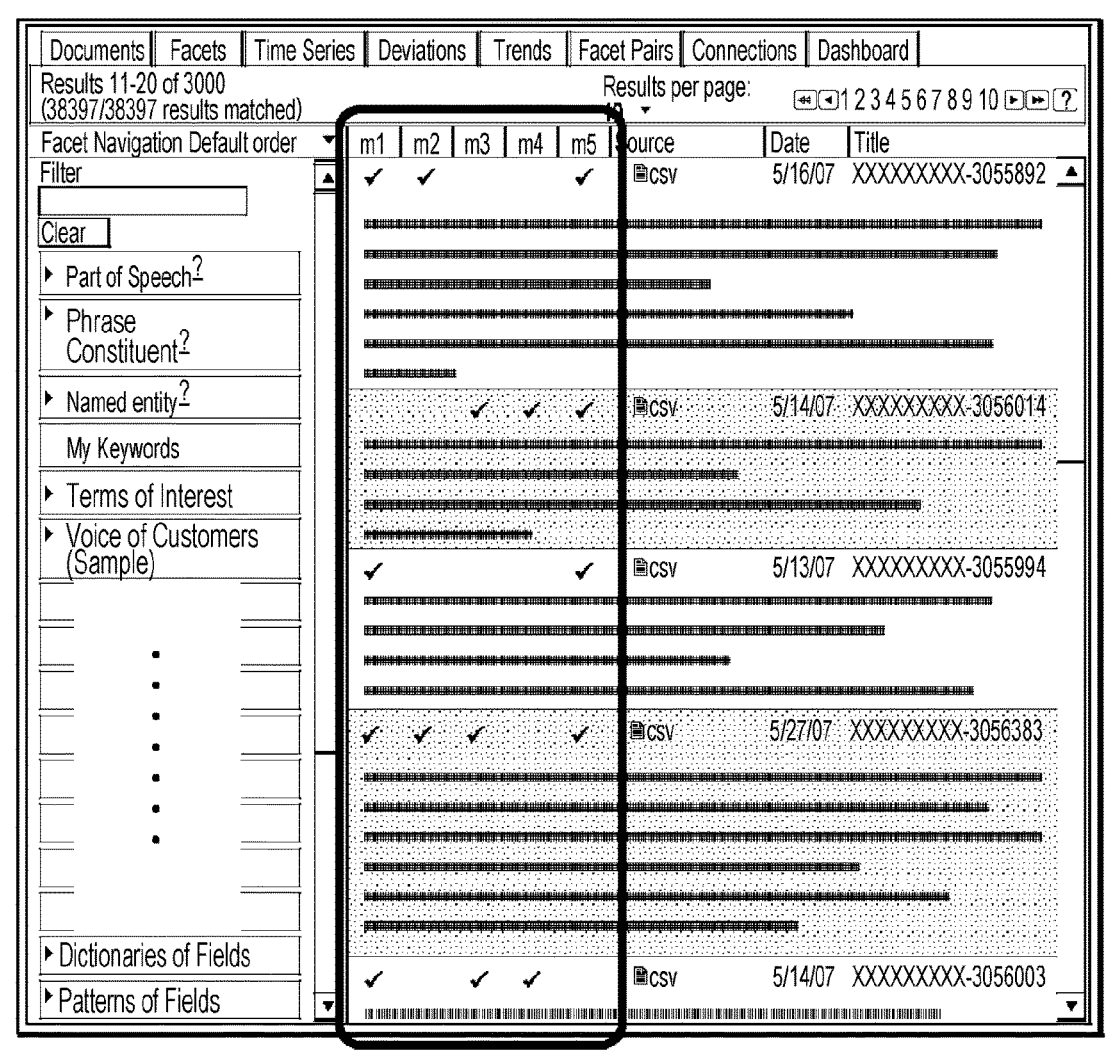

Next, the selected K pieces of review text are displayed by output module 104 on display 18 in S104. FIG. 8 illustrates an example of a display screen. In the screen, some of the selected K pieces of review text are displayed. Focusing on a portion surrounded by a thick rectangle, the pieces of review text are displayed so a user can recognize which evaluation function has given each of the pieces of review text a high evaluation score, so that the piece of text is selected on the basis of the evaluation score. For example, regarding a piece of review text displayed in the top of the screen, check marks are placed in the columns of m1, m2, and m5. It can be understood that the piece of review text is displayed on the basis of evaluation results obtained by evaluation functions m1, m2, and m5. Further, an evaluation function that a user thinks is an unnecessary evaluation function can be removed, and a new evaluation function can be added. Also, only evaluation results obtained by a specific evaluation function can be displayed. Additionally, the evaluation results can be simply displayed using icons. Note that output module 104 can also display, on display 18, the graph illustrated in FIG. 7.

By performing the above-described method, pieces of review text including favorable opinions can be impartially extracted. In other words, pieces of review text including only favorable opinions, pieces of review text additionally including unfavorable opinions, and so forth can be included in the K pieces of review text. As a result, the probability that a user (analyst) can access, within a range of the amount of information which the user (analyst) can finish reading or the amount of information which can be displayed as a list in a display screen, favorable information which the user (analyst) will certainly want to grasp is increased. Further, when the information is displayed, the user (analyst) can intuitively understand that the order is not a one-dimensional order. In addition, the user (analyst) can refer to, in a targeted manner, the type of piece of review text that the user (analyst) is interested in.

Note that the present invention can take the form of an entirely hardware embodiment, an entirely software embodiment, and an embodiment including elements of both software and hardware. In a preferred embodiment, the present invention is implemented in software which includes, but is not limited to, firmware, resident software, microcode, and parser pico-code.

Further, the invention can take the form of a computer program product or a computer-readable medium that includes program code for utilization by or in connection with a computer or any instruction execution system. For the purposes of this description, the computer-readable medium can be any apparatus that can contain, store, communicate, propagate, or transport the program product for utilization by or in connection with the instruction execution system, apparatus, or device. Specifically, the above-mentioned parser control module constitutes an instruction execution system or "computer" in this sense.

The medium can be an electronic, magnetic, optical, electromagnetic, infrared, or semiconductor system (or apparatus or device) or a propagation medium. Examples of the computer-readable medium include a semiconductor or solid state memory, a magnetic tape, a removable computer diskette, a random access memory (RAM), a read-only memory (ROM), a rigid magnetic disk, and an optical disk. Current examples of the optical disk include a compact disk read only memory (CD-ROM), a compact disk read/write (CD-R/W), and a DVD.

A data processing system suitable for storing and/or executing program code can include at least one processor coupled directly or indirectly to memory elements through a system bus. The memory elements can include a local memory employed during actual execution of the program code, a bulk storage device, and cache memories which provide temporary storage of at least some program code in order to reduce the number of times code must be read from the bulk storage device during execution.

What is claimed is:

1. A computer-implemented method for extracting pieces of text from a plurality of pieces of text, the method comprising the steps of:

primarily evaluating a measure of positive expressions and a measure of negative expressions included in each of the plurality of pieces of text stored in a computer memory;

secondarily evaluating each of the plurality of pieces of text using a processor on the basis of a plurality of evaluation functions, wherein each of the plurality of evaluation functions include, as variables, the measure of positive expressions and the measure of negative expressions;

rating each of the plurality of pieces of text based on an evaluation score calculated by each of the plurality of evaluation functions and given to each of the pieces of text;

extracting a piece of text having an evaluation result with a higher rating in preference to a piece of text having an evaluation result with a lower rating, wherein the individual evaluation results are based on the same evaluation function among the plurality of evaluation functions, wherein, in the primary evaluating step, the measure of positive expressions and the measure of negative expressions are primarily evaluated on the basis of a number of positive expressions and a number of negative expressions included in each of the pieces of text; and outputting each of the extracted pieces of text to a user on a display, wherein each of the extracted pieces of text is displayed for recognizing which evaluation function has given each of the extracted pieces of text a higher evaluation score.

2. The method of claim 1, wherein one evaluation function among the plurality of evaluation functions is a function outputting an evaluation result with a higher rating for a piece of text having an average measure of positive expressions and an average measure of negative expressions.

3. The method of claim 1, wherein one evaluation function among the plurality of evaluation functions is represented by a sum of the measure of positive expressions and the measure of negative expressions.

4. The method of claim 1, wherein one evaluation function among the plurality of evaluation functions is represented by a difference between the measure of positive expressions and the measure of negative expressions.

5. The method of claim 1, wherein, in the extracting step, pieces of text having individual evaluation results based on different evaluation functions among the plurality of evaluation functions are extracted in a predetermined order.

6. The method of claim 1, wherein, in the outputting step, which evaluation function has given the extracted piece of text an evaluation result for each of the plurality of evaluation functions, so that each of the pieces of text is extracted on the basis of the evaluation result, is output together to the user and indicates which of the evaluation functions extraction was based.

7. The method of claim 1, wherein, in the outputting step, the positive expressions and the negative expressions included in the extracted piece of text are output in different expression forms.

8. The method of claim 1, wherein the plurality of evaluation functions includes evaluating the plurality of pieces of text to assign a rating that increases with an increasing number of favorable words, evaluating the plurality of pieces of text to assign a rating that increases with an increasing number of evaluation words regardless of whether the evaluation words are favorable words or unfavorable words, and evaluating the plurality of pieces of text to assign a rating that increases with an increasing ratio of favorable words to evaluation words.

9. The method of claim 1, wherein evaluating the plurality of pieces of text to assign a rating that increases with an increasing number of favorable words and decreasing number of unfavorable words.

10. The method of claim 1, wherein the plurality of evaluation functions includes p, p+n, p/(p+n), a p−n, where p is the number of favorable words in each of the plurality of pieces of text, and n is the number of unfavorable words in each of the plurality of pieces of text.

11. The method of claim 10, wherein evaluation scores are assigned to each of the plurality of pieces of text for each of the plurality of evaluation functions: p, p+n, p/(p+n), and p−n.

12. The method of claim 11, wherein extracting a piece of text having an evaluation result with a higher rating in preference to a piece of text having an evaluation result with a lower rating is based on the evaluation scores assigned to each of the plurality of pieces of text for each of the plurality of evaluation functions.

13. The method of claim 10, further comprising removing an evaluation function indicated by a user as unnecessary from the plurality of evaluation functions.

14. A computer program product for extracting pieces of text from a plurality of text, the computer program product comprising a non-transitory computer readable storage medium having program code embodied therewith, the program code readable/executable by a device to perform the steps of a method comprising:
  primarily evaluating a measure of positive expressions and a measure of negative expressions included in each of the plurality of pieces of text stored in a computer memory;
  secondarily evaluating each of the plurality of pieces of text using a processor on the basis of a plurality of evaluation functions, wherein each of the plurality of evaluation functions include, as variables, the measure of positive expressions and the measure of negative expressions;
  rating each of the plurality of pieces of text based on an evaluation score calculated by each of the plurality of evaluation functions and given to each of the plurality of pieces of text;
  extracting a piece of text having an evaluation result with a higher rating in preference to a piece of text having an evaluation result with a lower rating for each of the plurality of evaluation functions, wherein the individual evaluation results are based on the same evaluation function among the plurality of evaluation functions, wherein, in the primary evaluating step, the measure of positive expressions and the measure of negative expressions are primarily evaluated on the basis of a number of positive expressions and a number of negative expressions included in each of the pieces of text; and
  outputting each of the extracted pieces of text to a user on a display, wherein each of the extracted pieces of text is displayed for recognizing which evaluation function has given each of the extracted pieces of text a higher evaluation score.

15. A computer implemented system for extracting pieces of text from a plurality of pieces of text, the system comprising:
  a memory;
  a processor communicatively coupled to the memory;
  a module communicatively coupled to the memory and the processor, wherein the module is configured to perform the steps of a method comprising:
  primarily evaluating a measure of positive expressions and a measure of negative expressions included in each of the plurality of pieces of text stored in a computer memory;
  secondarily evaluating each of the plurality of pieces of text using a processor on the basis of a plurality of evaluation functions, wherein each of the plurality of evaluation functions include, as variables, the measure of positive expressions and the measure of negative expressions;
  rating each of the plurality of pieces of text based on an evaluation score calculated by each of the plurality of evaluation functions and given to each of the plurality of pieces of text;
  extracting a piece of text having an evaluation result with a higher rating in preference to a piece of text having an evaluation result with a lower rating for each of the plurality of evaluation functions, wherein the individual evaluation results are based on the same evaluation function among the plurality of evaluation functions, wherein, in the primary evaluating step, the measure of positive expressions and the measure of negative expressions are primarily evaluated on the basis of a number of positive expressions and a number of negative expressions included in each of the pieces of text; and
  outputting each of the extracted pieces of text to a user on a display, wherein each of the extracted pieces of text is displayed for recognizing which evaluation function has given each of the extracted pieces of text a higher evaluation score.

\* \* \* \* \*